T. W. TYLER & W. C. BASKIN.
Corn-Planter.
No. 204,925. Patented June 18, 1878.
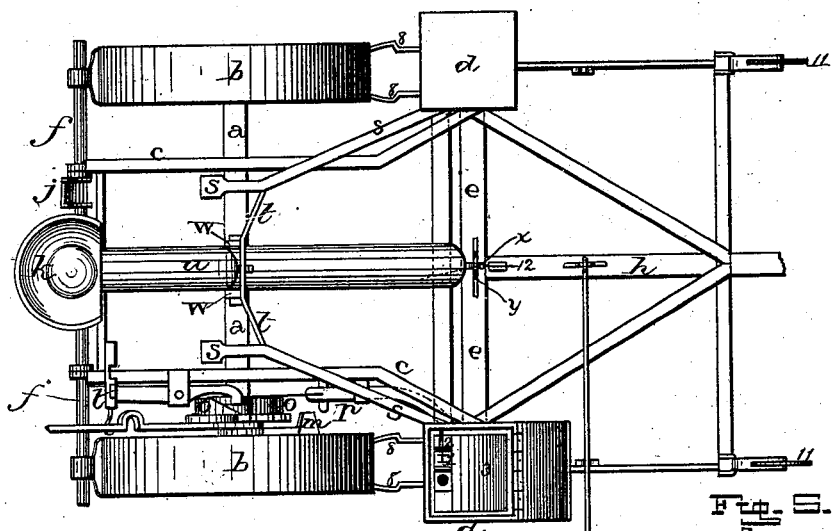
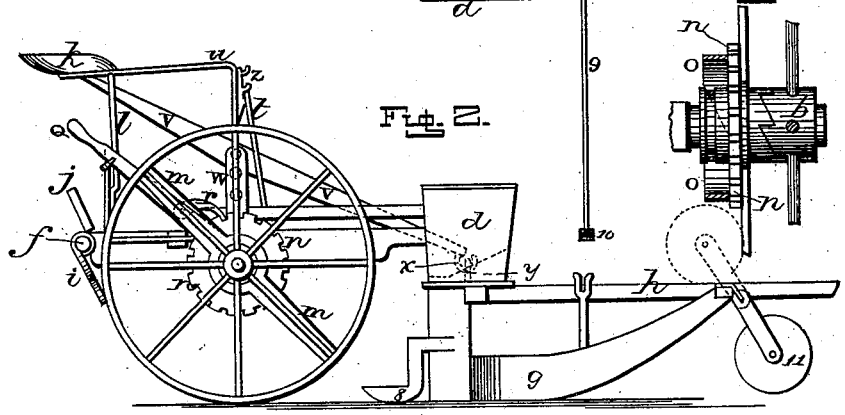
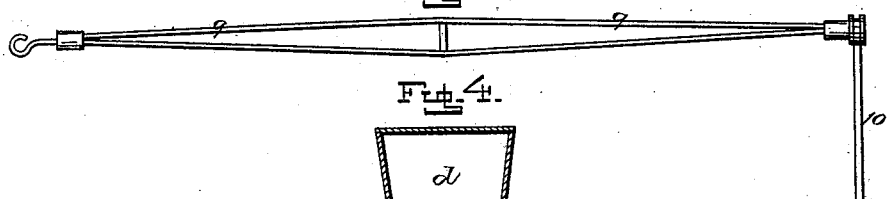
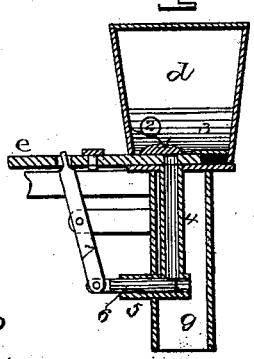
Witnesses.
Inventors.

UNITED STATES PATENT OFFICE.

THOMAS W. TYLER AND WILLIAM C. BASKIN, OF HAMMOND, ILLINOIS.

IMPROVEMENT IN CORN-PLANTERS.

Specification forming part of Letters Patent No. 204,925, dated June 18, 1878; application filed April 12, 1878.

*To all whom it may concern:*

Be it known that we, THOS. W. TYLER and WM. C. BASKIN, of Hammond, in the county of Piatt and State of Illinois, have invented certain new and useful Improvements in Automatic Corn-Planters; and we do hereby declare the following to be a full, clear, and exact description of the invention, such as will enable others skilled in the art to which it pertains to make and use it, reference being had to the accompanying drawings, which form part of this specification.

Our invention relates to an improvement in automatic corn-planters; and it consists in the arrangement and combination of parts that will be more fully described hereinafter.

The accompanying drawings represent our invention.

Figure 1 is a plan view of our invention. Fig. 2 is a side elevation of the same. Figs. 3 and 4 are detail views.

$a$ represents the axle; $b$, the two driving-wheels; $c$, the rectangular frame secured to the top of the axle; $d$, the corn or seed boxes; $e$, the seed-slide; $g$, the furrow-openers, and $h$ the tongue; and these parts may be constructed in any way that may be preferred.

Pivoted upon the rear end of the frame is a shaft, $f$, to each end of which is secured a scraper or cleaning device, $i$, for cleaning the dirt from the wheels $b$. Projecting upward from this shaft $f$ is a short foot-lever, $j$, against which the driver, while sitting on the seat $k$, can press backward with one of his feet, so as to bring the cleaning devices in contact with the wheels whenever they need cleaning.

Upon one end of the axle, and upon the inner side of the hub of one of the wheels, is formed the usual clutch, so that the wheel can be thrown in and out of gear with the dropping mechanism whenever it is so desired. This clutch is connected to the hand-lever $l$, which reaches up beside the driver's seat, so that he can throw the dropping mechanism out of gear at any moment. Passing over the movable portion of the clutch is the marker $m$, which consists of a long straight rod or plate, having its ends bent at right angles, as shown. These ends reach just about to the edge of the wheel, and serve to mark each hill where the corn has been planted. As the machine moves over the field these flat bent ends make a distinct mark, so that a person can see at a glance afterward where every hill in the field is located. Also secured to the movable part of the clutch is a wheel, $n$, which has notches formed all around its periphery, and projecting from its inner side are the two cams $o$, for operating the lever $p$ and seed-slide $e$. These cams, it will be seen, are beveled away at one end, and are cut away sharply and abruptly at the other, so that, as the wheel $n$ is made to revolve around, each of the cams in succession gradually moves the lever $p$ sidewise until it reaches the cut-away end of the cam, when, the lever being released, the seed-slide snaps instantly back into position again.

Loosely passed over the sliding portion of the clutch, just outside of this wheel $n$, is a hand-lever, $q$, which is provided with the dog $r$ for catching in the notches in the edge of of the wheel $n$. In drawing this lever $q$ backward the dog slips loosely over the notches; but the moment the lever is moved forward the dog catches in one of the notches, and causes the wheel $n$ to move forward and around. As this wheel $n$ operates the seed-slide altogether, it will readily be seen that the driver can so move the wheel that the seed-slide will drop at any desired point. If, in turning around at the end of the row and starting again on another row, the seed-slide should not be in position to drop exactly in a row with the last seed dropped, the driver has simply to move the wheel $n$ around, by means of the lever $q$ and dog $r$, until the slide is just in that position where, if once started, it will drop the seed in the desired place. In the same manner he can adjust the dropping of the seed in the center of the field or at any other point, so that he has the distance between the hills always absolutely under his control.

The corn-boxes $d$ are secured upon the top of the furrow-openers $g$ in the usual manner, and are pivoted to the front ends of the frame $c$, as shown. Projecting rearwardly from each of the corn-boxes is a foot-lever, $s$, which levers are connected together near their rear ends by the bent rod $t$, which rod projects upward just in front of the extension $u$ in front of the driver's seat $k$. The driver's seat $k$ is formed upon the rear end of the long lever v, which is pivoted between the perforated ears w, which rise upward from the top of the axle a. These ears have a series of holes through them, so that this lever can be adjusted to any height desired, and by means of this adjustment control the depth to which the furrow-openers shall enter the earth.

To the front end of the lever v is secured a hook, x, which catches in a loop, y, and thus acts to raise the furrow-openers upward.

As the levers s, connected to the inner side of the corn-boxes, are connected together by the bent rod t, and as this bent rod catches in the notches z formed upon the extension u, the driver can control, at will, whether the furrow-openers shall enter the earth one, two, or more inches by catching the bent rod t in one of these notches. As the weight of his feet bear downward upon the ends of the lever s so as to raise the front ends of the furrow-openers upward, and as the seat-lever rises upward upon the rear ends of the furrow-openers, it will readily be seen that the driver can regulate and keep the furrow at the same uniform depth all over the field.

In the seed-boxes are placed small blocks 1, to which are fastened the springs 2. These blocks rest upon the top of the ends of the seed-slides, and serve as cut-offs for the grain. The springs allow them a slight movement should the grains catch in the slide, and thus prevent the dropping mechanism from getting out of repair.

In order to cause the grain to flow downward toward the hole in the seed-slide, an inclined plate, 3, is placed in the bottom of the box, as shown. As the seeds drop through the seed-slide they fall into the vertical tube 4, which projects downward through the inner side of the furrow-openers. At the lower end of this tube 4, and extending at right angles thereto, is another short tube, 5, in which works the piston 6. The grains of corn drop down into this tube 5, just in front of the inner end of the piston, and then as the seed-slide snaps back into position this piston is suddenly forced inward by the connecting-rod 7, so as to throw the grain out of the tube 5 against the opposite side of the furrow-opener. As the grains strike the side of the furrow-opener they rebound to the opposite side, and then fall into the furrow, scattered some little distance apart, instead of being dropped in a wad, as is now the case with other corn-planters. By thus scattering them somewhat in the hill they grow without interfering with each other in the slightest degree.

Secured to the rear side of the lower end of each of the furrow-openers are the two bent rods 8, which extend outward some little distance beyond the sides of the furrow-openers, and, catching the turned-up earth which is thrown upon each side by the openers, forces it inward, so as to cover the corn just dropped. These rods cover the corn, and then the wheels b pass over it, so as to press the earth tightly down upon it.

Pivoted upon the top of the tongue is a long rod, 9, which can be turned so as to project beyond either side of the planter. Pivoted upon the outer end of this rod 9 is another rod, 10, which hangs downward, and serves as a guide to indicate where the next row is to be planted. This rod 10 does not reach quite to the ground, but hangs down over the track made by the wheel of the machine as it last moved across the field. By keeping this rod 10 hanging vertically over this track he will be guided for every succeeding row. Where this rod is made long enough to extend down and catch in the ground a side pull is exerted upon the machine, which makes it unsteady and uncertain in its action.

Upon the front end of each one of the furrow-openers is pivoted a rolling colter, 11, which may project downward, and serve to cut the sod, corn-stalks, and other obstructions which may come in the way, and thus prevent them from catching under the furrow-openers and impeding the forward progress of the planter. When these colters are not needed they can be turned upward over the top of the furrow-openers, so that they will not be in the way.

Secured upon the top of the tongue is the flat spring 12, which, catching against a projection upon the under side of the seed-slide, causes the slide to snap back into position again after it has been moved by the lever p.

Should it be desired to drill corn or other grain, the large cam-wheel o may be removed, and a wheel having a number of cams may be used in its stead. By making these cams close together, the dropping mechanism will be made to operate rapidly, and will thus drill the corn instead of planting it in hills.

When it is desired to raise the furrow-openers entirely out of the ground in passing along the road or from field to field, by hanging the connecting-rod t on the top notch z the whole front part of the frame will be raised upward, and it is immaterial whether the driver is upon his seat or not. By thus being able to lift the furrow-openers entirely out of the ground they will be kept from much rust and useless wear.

Having thus described our invention, we claim—

1. In a seed-planter, the combination of the cogged wheel n, having the cams o, operating-lever q, provided with the dog r, rod or lever p, and seed-slide e, and the operating-spring, the lever being connected to the slide and the slide being moved directly by the cams, as shown and described.

2. The combination of the movable part of the clutch, the wheel n, operating-lever q, dog r, marker m, and an operating-lever for throwing the clutch in and out of gear with the driving-wheel b, substantially as shown.

3. The combination of the foot-levers s, secured to the seed-boxes d, and having their rear ends connected together by means of the bent rod $t$, with the extension $u$ in front of the seat and notches $z$ for the rod to catch in, substantially as described.

4. The combination of the pivoted lever $v$, having a hook or catch upon its front end for raising up the rear ends of the furrow-openers, with the levers $s$, rod $t$, and notches $z$, substantially as specified.

5. In a seed-planter, the combination of a seed-box, $d$, a tube, 4, depending therefrom and located in the furrow-opener $g$, and a piston or its equivalent for shooting the seeds against the inside of the opener $g$, so as to scatter them on the ground, substantially as shown.

6. The combination of the box $d$, furrow-opener $g$, tubes 4 5, piston 6, rod 7, seed-slide $e$, and operating-spring, substantially as described.

In testimony that we claim the foregoing we have hereunto set our hands.

THOS. W. TYLER.
WILLIAM C. BASKIN.

Witnesses:
A. J. MYERS,
W. A. LISTON.